(12) United States Patent
Haga et al.

(10) Patent No.: US 7,524,113 B2
(45) Date of Patent: Apr. 28, 2009

(54) HYDRODYNAMIC BEARING DEVICE

(75) Inventors: Tomohiro Haga, Ehime (JP); Junichi Nakamura, Ehime (JP)

(73) Assignee: Panasonic Corporation, Osaka (JP)

( * ) Notice: Subject to any disclaimer, the term of this patent is extended or adjusted under 35 U.S.C. 154(b) by 441 days.

(21) Appl. No.: 11/501,105

(22) Filed: Aug. 9, 2006

(65) Prior Publication Data

US 2007/0071378 A1    Mar. 29, 2007

(30) Foreign Application Priority Data

Sep. 27, 2005    (JP)    ............................. 2005-280315

(51) Int. Cl.
*F16C 32/06*    (2006.01)
(52) U.S. Cl. .................................... 384/123
(58) Field of Classification Search ................ 384/107, 384/112, 121, 123, 124
See application file for complete search history.

(56) References Cited

U.S. PATENT DOCUMENTS

| | | | |
|---|---|---|---|
| 3,841,720 A * | 10/1974 | Kovach et al. ............... | 384/123 |
| 6,350,059 B1 | 2/2002 | Takahashi | |
| 6,435,721 B1 * | 8/2002 | Inoue et al. .................. | 384/123 |
| 6,505,970 B2 * | 1/2003 | Takahashi et al. ........... | 384/123 |
| 6,702,464 B1 * | 3/2004 | Takeuchi et al. ............ | 384/107 |
| 7,438,476 B2 * | 10/2008 | Gotoh et al. ................. | 384/112 |

FOREIGN PATENT DOCUMENTS

| | | |
|---|---|---|
| JP | 9-303381 | 11/1997 |
| JP | 10-217035 | 8/1998 |
| JP | 2000-346056 | 12/2000 |

* cited by examiner

*Primary Examiner*—Thomas R Hannon
(74) *Attorney, Agent, or Firm*—Wenderoth, Lind & Ponack, L.L.P.

(57) ABSTRACT

A hydrodynamic bearing device which can improve reliability by stabilizing a balance of dynamic pressures generated at a thrust bearing portion. The spindle motor 1 includes a hydrodynamic bearing device 4 including a shaft 41, a sleeve 42, first and second thrust flanges 41b and 41c, first and second thrust bearing portions 72 and 73 and thrust dynamic pressure generating grooves 72a and 73a. The thrust dynamic pressure generating grooves 72a and 73a are formed such that a plurality of groove portions are connected without being isolated from each other, and the groove depth becomes greater from the inner periphery toward the outer periphery.

8 Claims, 14 Drawing Sheets

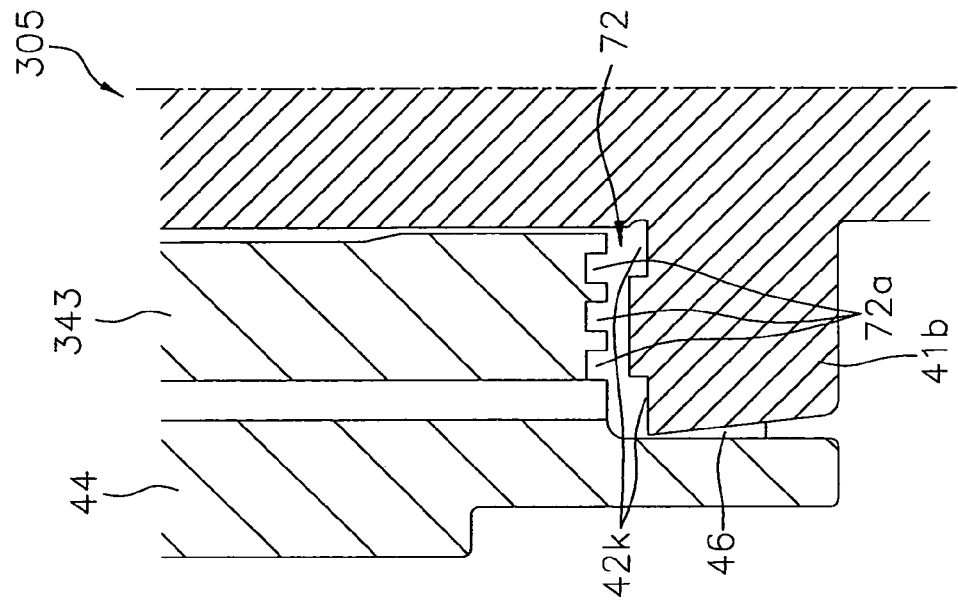
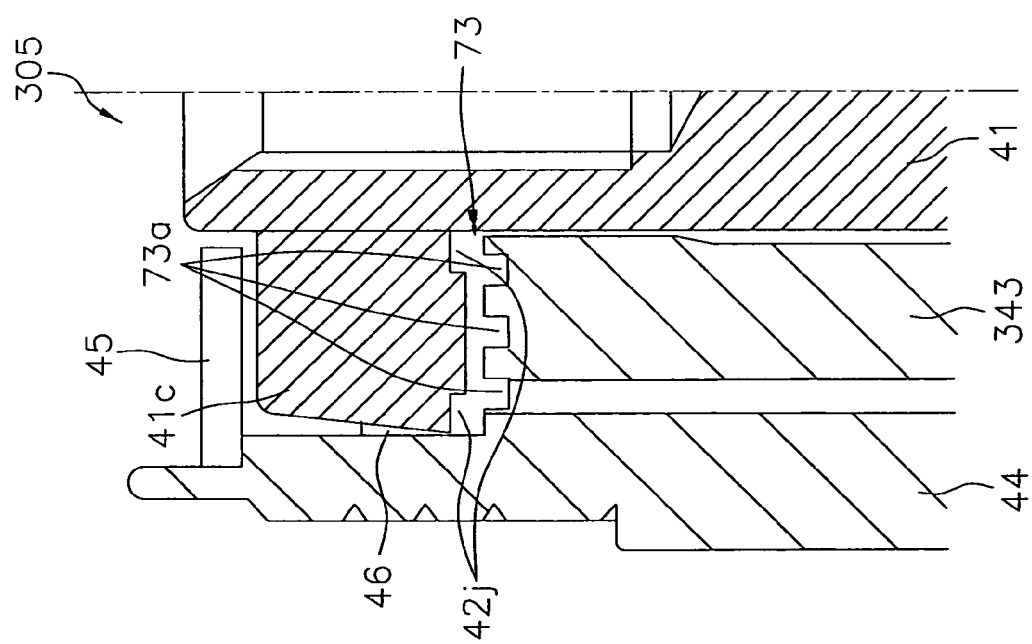

HYDRODYNAMIC BEARING DEVICE

TECHNICAL FIELD

The present invention relates to a hydrodynamic bearing device having a thrust dynamic pressure bearing portion.

BACKGROUND ART

Conventionally, hydrodynamic bearing devices having a thrust dynamic pressure generating portion formed on a surface of either a sleeve or a shaft have been used. In the thrust dynamic pressure generating portion, a dynamic pressure is generated by rotating the sleeve or the shaft which is a rotating part to rotate the rotating part in a non-contact state, which means that a predetermined space is interposed therebetween.

For example, Japanese Laid-Open Publication No. 2000-346056 discloses a thrust dynamic pressure bearing having a plurality of dynamic pressure generating grooves formed on an end surface of a flange formed on an end surface of the shaft. The dynamic pressure generating grooves having a herringbone pattern, and are formed with a predetermined gap interposed among them in a circumferential direction.

The dynamic pressure generating grooves formed in the thrust dynamic pressure bearing gradually become shallower from the outermost periphery toward a central portion in a radial direction, and also gradually become shallower from the innermost periphery toward the central portion in the radial direction. A depth of the grooves in the outermost peripheral portion in the radial direction is greater than a depth of the grooves in the innermost peripheral portion in the radial direction.

Japanese Laid-Open Publication No. 9-303381 discloses a thrust dynamic pressure bearing having a plurality of dynamic pressure grooves for axial supporting arranged in a spiral pattern in a circumferential direction on an end surface of an axis in an axial direction. The outer edge of the end surface has a curved shape.

In the thrust dynamic pressure bearing, a flat portion having a width of 1 mm or shorter, ore preferably, 0.5 mm or shorter is provided between the outer edge and the dynamic pressure grooves.

DISCLOSURE OF THE INVENTION

Problems to be Solved by the Invention

However, the above conventional hydrodynamic bearing devices have the following problems.

Specifically, in the structure of the thrust dynamic pressure bearing disclosed in Japanese Laid-Open Publication No. 2000-346056, there is a possibility that a predetermined groove depth cannot be kept due to metal-to-metal contact of a thrust surface with an opposing surface when the motor, and, in turn, the bearing starts to rotate, or the like.

When rotation is started at the thrust bearing portion, a dynamic pressure is generated between a flat surface of the housing and the flange. At this time, the flange undergoes precession until it floats. This means that a surface of the flange and a portion around the outer periphery which oppose thereto are shaved due to metal-to-metal wear caused by metal-to-metal contact between them. When the portion around the outer periphery of the thrust bearing surface of the flange is shaved, the depth of the dynamic pressure generating grooves becomes small. Thus, a lubricating fluid cannot be efficiently gathered to a central portion in the radial direction of the dynamic pressure generating grooves.

In the structure described in the Japanese Laid-Open Publication No. 2000-346056, a balance of the dynamic pressure in the thrust direction is destroyed, and a dynamic pressure balance required in the thrust bearing portion cannot be obtained.

Similarly, in the structure of the thrust dynamic pressure bearing disclosed in Japanese Laid-Open Publication No. 9-303381 has a problem that a predetermined depth of the grooves cannot be secured due to metal-to-metal contact in the thrust bearing portion when the motor starts to rotate or the like.

More specifically, the thrust bearing portion has a bearing surface and an end surface in the axial direction contacting each other while the motor is not rotating. When the motor starts to rotate from such a state, a dynamic pressure is generated by a lubricant in the dynamic pressure grooves. However, the lubricant in the dynamic pressure grooves is insufficient for floating, and the bearing surface and the end surface in the axial direction are in metal-to-metal contact during floating. When a gap is formed between the bearing surface and the end surface in the axial direction, the lubricant flows into the thrust bearing portion through the outer peripheral edge. The metal-to-metal contact causes the end surface in the axial direction to be shaved, and the groove depth of the dynamic pressure grooves becomes small. Further, since the end surface in the axial direction undergoes precession until it floats, a portion of the end surface in the axial direction near the outer peripheral surface is further shaved. As a result, the depth of the entire dynamic pressure grooves becomes uneven. This causes an imbalance in the dynamic pressures generated at the thrust bearing portion.

In the structure disclosed in the Japanese Laid-Open Publication No. 9-303381, the dynamic pressure balance in the thrust direction is also destroyed, and the dynamic pressure balance required at the thrust bearing portion cannot be achieved.

An object of the present invention is to provide a hydrodynamic bearing device which can improve reliability by stabilizing a balance of dynamic pressures generated at a thrust bearing portion.

Means for Solving the Problems

A hydrodynamic bearing device according to the first invention comprises a shaft which serves as a rotational axis, a sleeve, a flange, a thrust bearing portion, and thrust dynamic pressure generating grooves. The sleeve has a radial bearing portion formed on an inner peripheral surface which opposes an outer peripheral surface of the shaft. The flange is integrated near one end of the shaft. The thrust bearing portion is formed between a surface of the flange, which is cross to a rotational axis direction, and a surface which opposes the surface of the flange which is cross to the rotational axis direction. A plurality of thrust dynamic pressure generating grooves are formed on either the surface of the flange which is cross to a rotational axis direction or a surface opposing thereto, which forms the thrust bearing portion. The thrust dynamic pressure generating grooves are connected to each other across the entire surface, and have a groove depth which becomes greater from the inner periphery toward the outer periphery with the rotational axis being a center.

In the hydrodynamic bearing device having the thrust dynamic pressure generating portion formed between the flange and the sleeve or a lower plate, a plurality of the thrust dynamic pressure generating grooves formed on a surface of either the shaft or the sleeve (or a circular member integrated to the sleeve) are formed such that they are connected to each other across the entire dynamic pressure generating surface, and have a groove depth which becomes greater from the inner periphery toward the outer periphery with the rotational axis being the center.

The thrust dynamic pressure generating grooves are formed on, for example, the thrust dynamic pressure generating surface, between convex portions formed to have a spiral pattern having the rotational axis as a center, or the herringbone pattern. Further, the surface of the flange which is cross to the rotational axis as described above may be, for example, a part of the sleeve, or may be a part of a circular member integrated to the sleeve. By filling a lubricant in the thrust dynamic pressure generating grooves, a dynamic pressure can be generated between the flange and the sleeve (or a circular member) at rotation. Further, the flange integrated to the shaft may be integrally formed with the shaft, or may be fixed by laser welding or the like.

Normally, when the thrust bearing portion is not rotating, two components forming the thrust bearing portion are in metal-to-metal contact. When the motor starts to rotate, initially, there is metal-to-metal contact. However, a dynamic pressure is generated by the lubricant of the thrust bearing portion and the thrust dynamic pressure generating grooves. A gap is formed between two components, and the rotating part is floated.

In the hydrodynamic bearing device of the present invention, as the rotation is started, the thrust dynamic pressure generating grooves are formed such that the groove depth becomes greater from the inner periphery toward the outer periphery, and the grooves are connected to each other across the entire thrust dynamic pressure generating surface.

This facilitates the lubricant to flow into the thrust dynamic pressure generating grooves, and the rotating part can be easily floated. As a result, a time period of metal-to-metal contact between the two components can be reduced significantly.

Since the grooves are all connected to each other across the entire thrust dynamic pressure generating surface, the lubricant does not become insufficient during a time period from when the metal-to-metal contact occurs at the start of rotation to when the rotating part floats.

Thus, even if the rotation is started and suspended repeatedly, a dynamic pressure required in the thrust bearing portion can always be generated. As a result, it becomes possible to shorten a length of a time of the metal-to-metal contact, and to suppress contamination due to metal-to-metal contact to obtain a hydrodynamic bearing device having a high reliability.

Further, since the groove depth of the thrust dynamic pressure generating grooves becomes greater toward the outer periphery, even though the convex portions of the thrust dynamic pressure generating grooves are worn off by the metal-to-metal contact due to contact with a portion of the flange near the outer diameter when the rotation is started, the dynamic pressure is always applied in one direction (in this example, direction toward rotational axis center). Accordingly, the dynamic pressure balance in the thrust bearing can be maintained in one direction for a long period of time.

The hydrodynamic bearing device of the present invention can be applied to any of a hydrodynamic bearing device having one end of the sleeve being open, and a hydrodynamic bearing device having both ends of the sleeve being open.

A hydrodynamic bearing device according to the second invention comprises a circular rotor hub, a shaft, a sleeve, a thrust bearing portion, and thrust dynamic pressure generating grooves. The shaft is integrated to the rotor hub, and serves as a rotational axis. The sleeve has a radial bearing portion formed between an inner peripheral surface of the sleeve and an outer peripheral surface of the shaft. The thrust bearing portion is formed between a surface of the rotor hub, which is cross to the rotational axis direction, and an opposing surface of the sleeve, which is cross to the rotational axis direction. The thrust dynamic pressure generating grooves are formed on one of the surfaces of the rotor hub and the sleeve, which are cross to the rotational axis direction, and are connected to each other across the entire surface. The thrust dynamic pressure generating grooves have a groove depth which becomes greater from the inner periphery toward the outer periphery with the rotational axis being a center.

In the hydrodynamic bearing device having the thrust dynamic pressure generating portion formed between the rotor hub and the sleeve and having the shaft which serves as the rotational axis fixed to the rotor hub, a plurality of the thrust dynamic pressure generating grooves formed on a surface of either the shaft or the sleeve are formed such that they are connected to each other across the entire dynamic pressure generating surface, and have a groove depth which becomes greater from the inner periphery toward the outer periphery with the rotational axis being the center.

The thrust dynamic pressure generating grooves are formed on, for example, the thrust dynamic pressure generating surface, between convex portions formed to have a spiral pattern having the rotational axis as a center, or the herringbone pattern. By filling a lubricant in the thrust dynamic pressure generating grooves, a dynamic pressure can be generated between the rotor hub and the sleeve at rotation.

This facilitates the lubricant to flow into the thrust dynamic pressure generating grooves, and the rotating part can be easily floated. As a result, a time period of metal-to-metal contact between the two components can be reduced significantly.

Since the grooves are all connected to each other across the entire thrust dynamic pressure generating surface, the lubricant does not become insufficient during a time period from when the metal-to-metal contact occurs at the start of rotation to when the rotating part floats.

Thus, even if the rotation is started and suspended repeatedly, a dynamic pressure required in the thrust bearing portion can always be generated. As a result, it becomes possible to shorten a length of a time of the metal-to-metal contact, and to suppress contamination due to metal-to-metal contact to obtain a hydrodynamic bearing device having a high reliability.

Further, since the groove depth of the thrust dynamic pressure generating grooves becomes greater toward the outer periphery, even though the convex portions of the thrust dynamic pressure generating grooves are worn off by the metal-to-metal contact when the rotation is started, the dynamic pressure is always applied in one direction (in this example, direction toward rotational axis center). Accordingly, the dynamic pressure balance in the thrust bearing can be maintained in one direction for a long period of time.

Moreover, when the circular convex portion and the convex portions having the herringbone pattern, which forms the thrust dynamic pressure generating grooves, are separated from each other on at least one of the inner periphery and the outer periphery, the dynamic pressure balance can be immediately stabilized even the surface on which the thrust dynamic pressure generating grooves are formed is inclined at the startup because the lubricant can be immediately supplied from the wider portion of the gap to the narrower portion.

A hydrodynamic bearing device according to the third invention comprises a shaft which serves as a rotational axis, a sleeve, a flange, a thrust bearing portion, thrust dynamic pressure generating grooves, and circular convex portions. The sleeve has a radial bearing portion formed between an inner peripheral surface of the sleeve and an outer peripheral surface of the shaft. The flange is integrated near one end of the shaft. The thrust bearing portion is formed between a surface of the flange, which is cross to a rotational axis direction, and a surface which opposes the surface of the flange which is cross to the rotational axis direction. The thrust dynamic pressure generating grooves are formed on either the surface of the flange which is cross to a rotational axis direction or a surface opposing thereto, which forms the thrust bearing portion. The circular convex portions are respectively formed on the innermost periphery and the outermost periphery of the surface on which the thrust dynamic pressure generating grooves are formed, and have a height greater than a depth of the thrust dynamic pressure generating grooves.

In the hydrodynamic bearing device having the thrust dynamic pressure generating portion formed between the flange and the sleeve or a circular member integrated to a lower end of the sleeve, the circular convex portions are respectively formed on the thrust dynamic pressure generating surface, on which the thrust dynamic pressure generating grooves are formed, at an edge of the inner periphery and an edge of the outer periphery with the rotational axis being the center. The circular convex portions are formed to have a height greater than the depth of the thrust dynamic pressure generating grooves formed on the thrust dynamic pressure surface.

The thrust dynamic pressure generating grooves are formed on, for example, the thrust dynamic pressure generating surface, between convex portions formed to have a spiral pattern having the rotational axis as a center, or the herringbone pattern. Further, the surface of the flange which is cross to the rotational axis as described above may be, for example, a part of the sleeve, or may be a part of a circular member integrated to the sleeve. By filling a lubricant in the thrust dynamic pressure generating grooves, a dynamic pressure can be generated between the flange and the sleeve at rotation. Further, the flange integrated to the shaft may be integrally formed with the shaft, or may be fixed by laser welding or the like.

Normally, the structure without the circular convex portions provided on the edges of the inner and outer peripheries of the surface on which the thrust dynamic pressure generating grooves are formed suffers from a problem that an etchant for forming the thrust grooves in the etching process flows out from the inner periphery and the outer periphery and affects the surface as it forms the grooves. Since the inner periphery is a fitting portion with the shaft, a change in dimension due to corrosion of by the etchant is not permissible. On the other hand, the outer periphery is a capillary seal portion of the bearing, and its surface roughness, dimension, shape and the like are important for providing capability for forming the seal. Corrosion by the etchant may results in failure in providing such an effect, and problems such as lubricant leakage may occur. Thus, a masking process has been required in the structure without the circular convex portions on the inner periphery and the outer periphery in order to protect the inner periphery and the outer periphery from corrosion by the etchant.

In the hydrodynamic bearing device of the present invention, the circular convex portions having a height greater than the groove depth of the thrust dynamic pressure generating grooves are respectively formed on edges of the inner and outer peripheries of the surface on which the thrust dynamic pressure generating grooves are formed.

Thus, the etchant can be prevented from flowing out from the inner periphery and the outer periphery by the inner and outer circular convex portions, and the dynamic pressure of the thrust bearing can be stabilized. Further, the masking process which is required in the conventional structure is no longer necessary, and the cost can be reduced.

The hydrodynamic bearing device of the present invention can be applied to any of a hydrodynamic bearing device having one end of the sleeve being open, and a hydrodynamic bearing device having both ends of the sleeve being open.

A hydrodynamic bearing device according to the fourth invention comprises a circular rotor hub, a shaft, a sleeve, a thrust bearing portion, thrust dynamic pressure generating grooves, and circular convex portions. The shaft is integrated to the rotor hub, and serves as a rotational axis. The sleeve has a radial bearing portion formed between an inner peripheral surface of the sleeve and an outer peripheral surface of the shaft. The thrust bearing portion is formed between a surface of the rotor hub, which is cross to the rotational axis direction, and an opposing surface of the sleeve, which is cross to the rotational axis direction. The thrust dynamic pressure generating grooves are formed on one of the surfaces of the rotor hub and the sleeve, which are cross to the rotational axis direction. The circular convex portions are respectively formed on the innermost periphery and the outermost periphery of the surface on which the thrust dynamic pressure generating grooves are formed, and have a height greater than a depth of the thrust dynamic pressure generating grooves.

In the hydrodynamic bearing device having the thrust dynamic pressure generating portion formed between the rotor hub and the sleeve and having the shaft which serves as the rotational axis fixed to the rotor hub, the circular convex portions are respectively formed on the thrust dynamic pressure generating surface, on which the thrust dynamic pressure generating grooves are formed, at an edge of the inner periphery and an edge of the outer periphery with the rotational axis being the center. The circular convex portions are formed to have a height greater than the depth of the thrust dynamic pressure generating grooves formed on the thrust dynamic pressure surface.

The thrust dynamic pressure generating grooves are formed on, for example, the thrust dynamic pressure generating surface, between convex portions formed to have a spiral pattern having the rotational axis as a center, or the herringbone pattern. By filling a lubricant in the thrust dynamic pressure generating grooves, a dynamic pressure can be generated between the flange and the sleeve at rotation.

Normally, the structure without the circular convex portions provided on the edges of the inner and outer peripheries of the surface on which the thrust dynamic pressure generating grooves are formed suffers from a problem that an etchant for forming the thrust grooves in the etching process flows out from the inner periphery and the outer periphery and affects the surface as it forms the grooves. Since the inner periphery is a fitting portion with the shaft, a change in dimension due to corrosion of by the etchant is not permissible. On the other hand, the outer periphery is a capillary seal portion of the bearing, and its surface roughness, dimension, shape and the like are important for providing capability for forming the seal. Corrosion by the etchant may results in failure in providing such an effect, and problems such as lubricant leakage may occur. Thus, a masking process has been required in the structure without the circular convex portions on the inner periphery and the outer periphery in order to protect the inner periphery and the outer periphery from corrosion by the etchant.

In the hydrodynamic bearing device of the present invention, the circular convex portions having a height greater than the groove depth of the thrust dynamic pressure generating grooves are respectively formed on edges of the inner and outer peripheries of the surface on which the thrust dynamic pressure generating grooves are formed.

Thus, the etchant can be prevented from flowing out from the inner periphery and the outer periphery by the inner and outer circular convex portions, and the dynamic pressure of the thrust bearing can be stabilized. Further, the masking process which is required in the conventional structure is no longer necessary, and the cost can be reduced. Moreover, when the circular convex portion and the convex portions having the herringbone pattern, which forms the thrust dynamic pressure generating grooves, are separated from each other on at least one of the inner periphery and the outer periphery, the dynamic pressure balance can be immediately stabilized even the surface on which the thrust dynamic pressure generating grooves are formed is inclined at the startup because the lubricant can be immediately supplied from the wider portion of the gap to the narrower portion.

A hydrodynamic bearing device according to the fifth invention is a hydrodynamic bearing device according to the first invention, in which circular convex portions having a height greater than a depth of the thrust dynamic pressure generating grooves are respectively formed on the inner periphery and the outer periphery of the surface on which the thrust dynamic pressure generating grooves are formed.

In the hydrodynamic bearing device in which a plurality of the thrust dynamic pressure generating grooves formed on a surface of either the shaft or the sleeve are formed such that they are connected to each other across the entire dynamic pressure generating surface, and have a groove depth which becomes greater from the inner periphery toward the outer periphery with the rotational axis being the center, the circular convex portions are respectively provided on the edges of the inner periphery and the outer periphery. The circular convex portions are formed to have a height greater than the depth of the thrust dynamic pressure generating grooves formed on the thrust dynamic pressure surface.

The circular convex portions on the inner and outer sides can reduce flow of the lubricant toward the outer periphery. Thus, dynamic pressure balance of the thrust bearing can be stabilized.

A hydrodynamic bearing device according to the sixth invention is a hydrodynamic bearing device according to the second invention, in which circular convex portions having a height greater than a depth of the thrust dynamic pressure generating grooves are respectively formed on the inner periphery and the outer periphery of the surface on which the thrust dynamic pressure generating grooves are formed.

In the hydrodynamic bearing device in which a plurality of the thrust dynamic pressure generating grooves formed on a surface of either the shaft or the sleeve are formed such that they are connected to each other across the entire dynamic pressure generating surface, and have a groove depth which becomes greater from the inner periphery toward the outer periphery with the rotational axis being the center, the circular convex portions are respectively provided on the edges of the inner periphery and the outer periphery. The circular convex portions are formed to have a height greater than the depth of the thrust dynamic pressure generating grooves formed on the thrust dynamic pressure surface.

The circular convex portions on the inner and outer sides can reduce flow of the lubricant toward the outer periphery. Thus, dynamic pressure balance of the thrust bearing can be stabilized.

A hydrodynamic bearing device according to the seventh invention is a hydrodynamic bearing device according to the third invention, in which circular groove portions are formed on an inner edge portion and an outer edge portion of a surface which opposes the surface on which the thrust dynamic pressure generating grooves are formed in the axial direction and which forms the thrust bearing portion.

In such a hydrodynamic bearing device, a bearing loss to be generated at portions inside and outside the portions which substantially generate the dynamic pressures, i.e., portions between the thrust dynamic pressure generating grooves and the opposing surface, and a portion between these portions, can be reduced with the dynamic pressures to be generated at the thrust bearing portions being secured.

A hydrodynamic bearing device according to the eighth invention is a hydrodynamic bearing device according to the fourth invention, in which circular groove portions are formed on an inner edge portion and an outer edge portion of a surface which opposes the surface on which the thrust dynamic pressure generating grooves are formed in the axial direction and which forms the thrust bearing portion.

In such a hydrodynamic bearing device, a bearing loss to be generated at portions inside and outside the portions which substantially generate the dynamic pressures, i.e., portions between the thrust dynamic pressure generating grooves and the opposing surface, and a portion between these two portions, can be reduced with the dynamic pressures to be generated at the thrust bearing portions being secured.

Effects of the Invention

According to the hydrodynamic bearing device of the present invention, a reliability of the dynamic pressure bearing is improved, a margin for designing the bearing is broadened and the cost can be reduced by stabilizing the balance of dynamic pressures generated at the thrust bearing portions all the time.

BRIEF DESCRIPTION OF THE DRAWINGS

FIG. 15A, 15B is an enlarged view showing a structure of a thrust bearing portion in a thrust bearing portion of the hydrodynamic bearing device according to yet another embodiment of the present invention.

BEST MODE FOR CARRYING OUT THE INVENTION

A spindle motor 1 including a hydrodynamic bearing device according to an embodiment of the present invention is described as follows with reference to FIGS. 1 through 10.

In the present embodiment, a vertical direction in the figures are referred to as "upper side in the axial direction", "lower side in the axial direction", and the like for the convenience of explanation. However, such expressions are not intended to limit how the spindle motor 1 is actually integrated.

[Entire Structure of the Spindle Motor 1]

Figure 1:
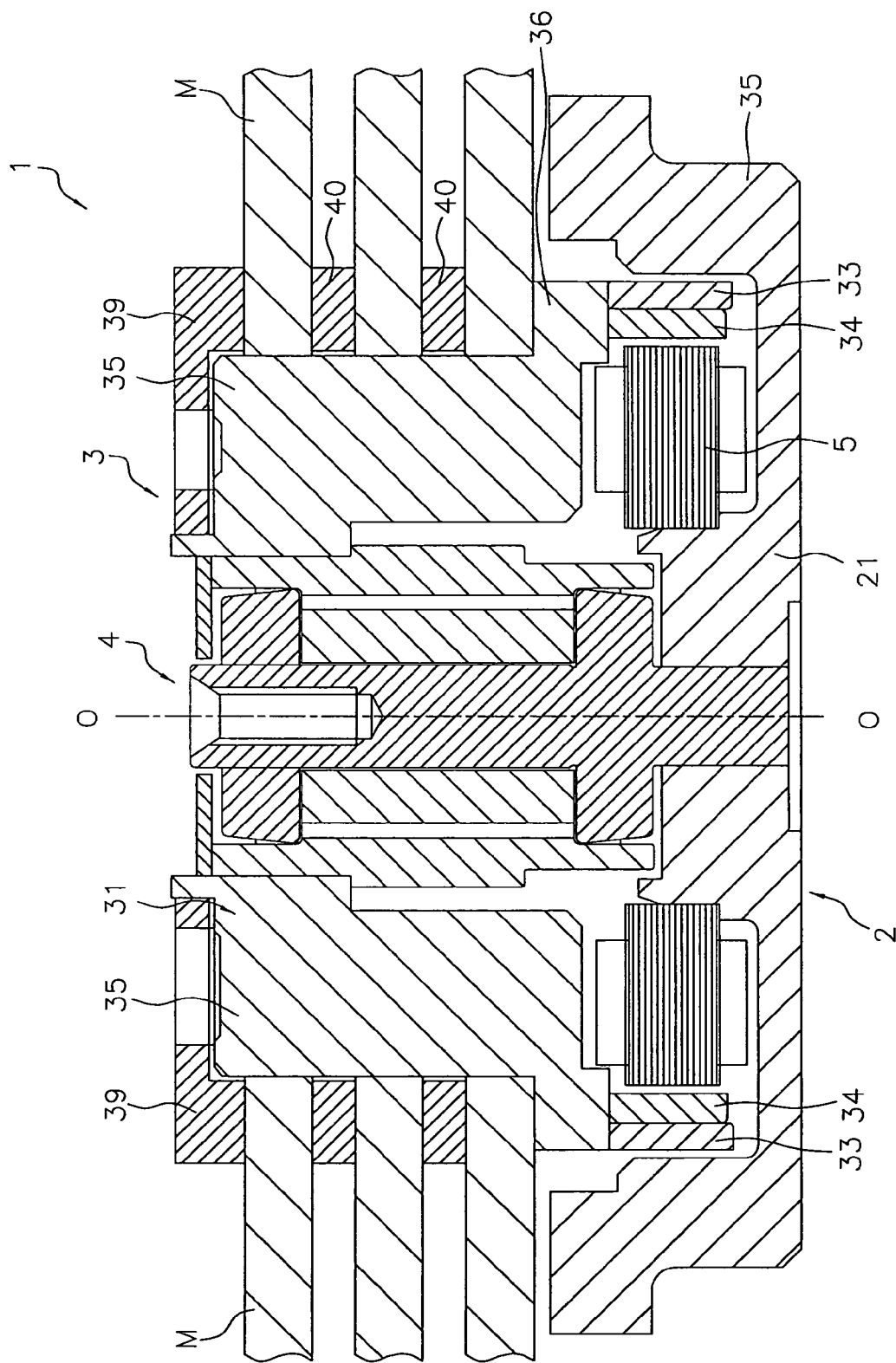
FIG. 1 is a cross-sectional view showing a structure of a spindle motor which includes a hydrodynamic bearing device according to one embodiment of the present invention.

As shown in FIG. 1, the spindle motor 1 includes, mainly, a base 2, a stator 5, a rotor 3, and a hydrodynamic bearing device 4. Line 0-0 shown in FIG. 1 is a rotational axis line of the spindle motor 1.

The base 2 includes a cylinder-shaped portion 21, and one end of a shaft 41 (see FIG. 2) of the hydrodynamic bearing device 4 is fixed to an inner periphery of the cylinder-shaped portion 21.

The rotor 3 is a member of a rotating part of the spindle motor 1, and is driven to rotate by a rotational force generated by a magnetic circuit. The structure of the rotor 3 will be described below in more detail.

Figure 2:
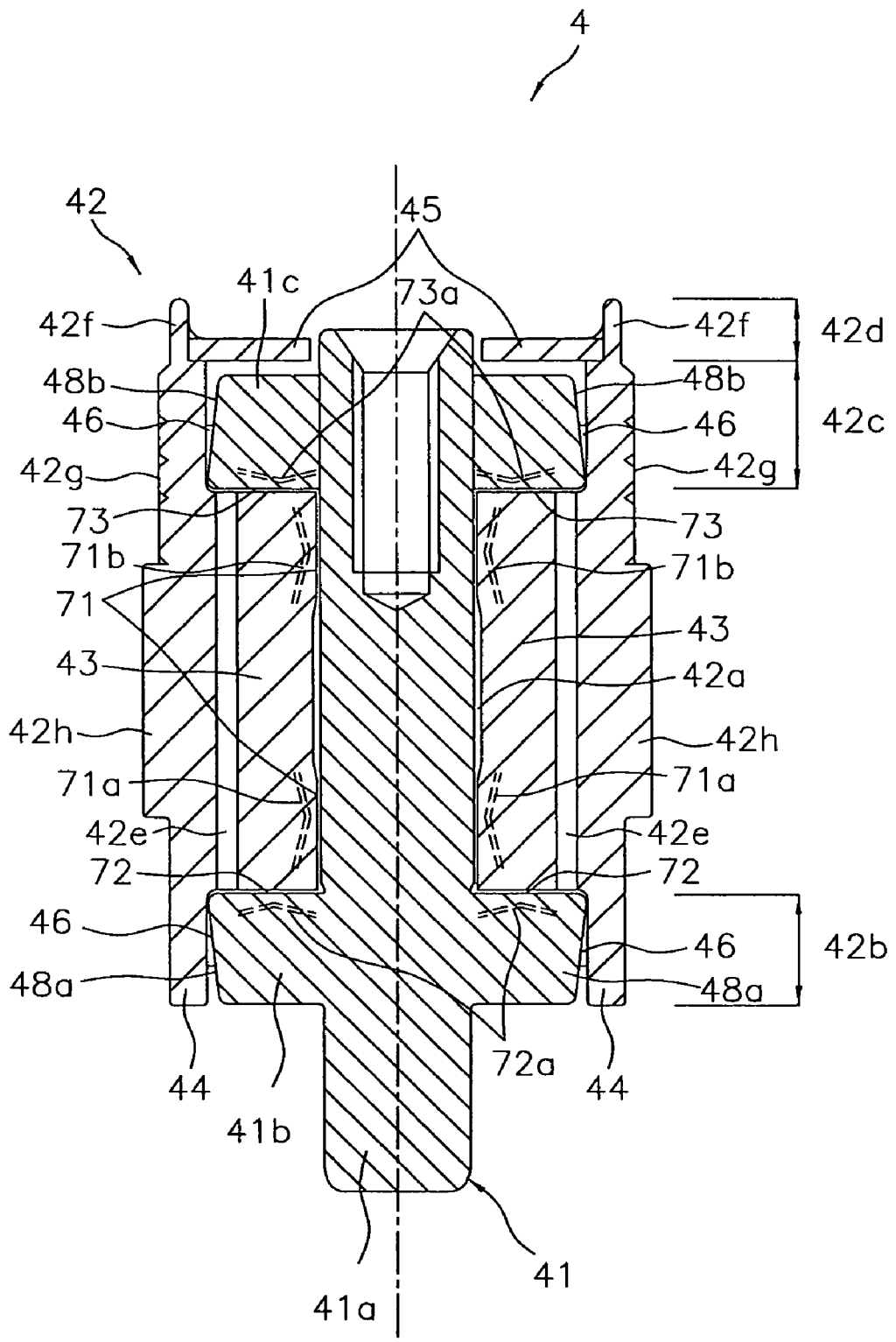
FIG. 2 is an enlarged view showing a structure of the hydrodynamic bearing device included in the spindle motor of FIG. 1.

As shown in FIG. 2, the hydrodynamic bearing device 4 is a device to be supported so as to be rotatable with respect to the base 2 and the stator 5. The hydrodynamic bearing device 4 will be described below in more detail.

The stator 5 forms a magnetic circuit with a back yoke 33 and a rotor magnet 34, which will be described later, and is fixed to an outer periphery of the cylinder-shaped portion 21.

A driving force in a rotational direction generated by the magnetic circuit drives the rotor 3 to rotate with respect to the base 2 and the stator 5.

[Structure of the Rotor 3]

As shown in FIG. 1, the rotor 3 includes the back yoke 33, the rotor magnet 34, and a rotor hub 31.

The back yoke 33 is a circular member provided on a lower side in an axial direction of the rotor hub 31, and is fixed by press-fitting or the like. Further, the material of back yoke 33 is magnetic body.

The rotor magnet 34 is a circular member which is positioned so as to oppose an outer periphery of the stator 5 in a radial direction, and is fixed to an inner periphery of the back yoke 33.

The rotor hub 31 is a member to which recording discs M are attached, and is fixed to an outer periphery of a sleeve 42 (see FIG. 2), which will be described below, by adhering or the like. Further, as shown in FIG. 1, the rotor hub 31 includes a rotor hub main body 35 and a disc placement portion 36.

The rotor hub main body 35 is a cylinder-shaped portion which supports the recording discs M in the radial direction, and is fixed to the outer periphery of the sleeve 42. On an outer periphery of the rotor hub main body 35, for example, three recording discs M are fitted.

The disc placement portion 36 is a circular portion for placing the recording discs M, and is formed on an outer peripheral side of a lower end in the axial direction of the rotor hub main body 35.

The recording discs M include, for example, magnetic discs and the like from/to which information can be read/write by information access means (not shown). The recording discs M are fixed to and positioned on the side of the rotor hub main body 35 by a clamper 39. For fixing a plurality of the recording discs M, the recording discs M are pinched and fixed with a certain distance being interposed between them by a spacer 40.

[Structure of the Hydrodynamic Bearing Device 4]

As shown in FIG. 2, the hydrodynamic bearing device 4 is a hydrodynamic bearing device of a both-end open type having both ends of the sleeve 42 being open, and includes the shaft 41 and the sleeve 42. The hydrodynamic bearing device 4 is also a hydrodynamic bearing device of a shaft fixed type in which a rotating member rotates around the fixed shaft 41.

(Shaft 41)

The shaft 41 is a member of a fixed part of the hydrodynamic bearing device 4, and its lower end in the axial direction is fixed to the cylinder-shaped portion 21 of the base 2. Further, the shaft 41 includes a shaft main body 41a, a first thrust flange 41b, and a second thrust flange 41c.

The shaft main body 41a is a cylindrical member which forms a main part of the shaft 41, and is located on the inner peripheral side of the sleeve 42 with a minute gap being provided from the sleeve 42.

The first thrust flange 41b is, for example, a circular member which is integrally formed with the shaft main body 41a, and is located on an inner peripheral side of a first cylinder-shaped projection 42b so as to oppose a lower end surface in the axial direction of the sleeve 42 in the axial direction with a minute gap interposed therebetween.

The second thrust flange 41c is a circular member located on an opposite side of the first thrust flange 41b in the axial direction with respect to the sleeve 42, and is fixed to the shaft main body 41a by laser welding or the like, for example. Further, the second thrust flange 41c is located on an inner peripheral side of a second cylinder-shaped projection 42c so as to oppose an upper end surface in the axial direction of the sleeve 42 with a minute gap interposed therebetween in the axial direction.

The first and second thrust flanges 41b and 41c have thrust dynamic pressure generation grooves 72a and 73a formed on surfaces which oppose parts of the sleeve 42.

Figure 3:
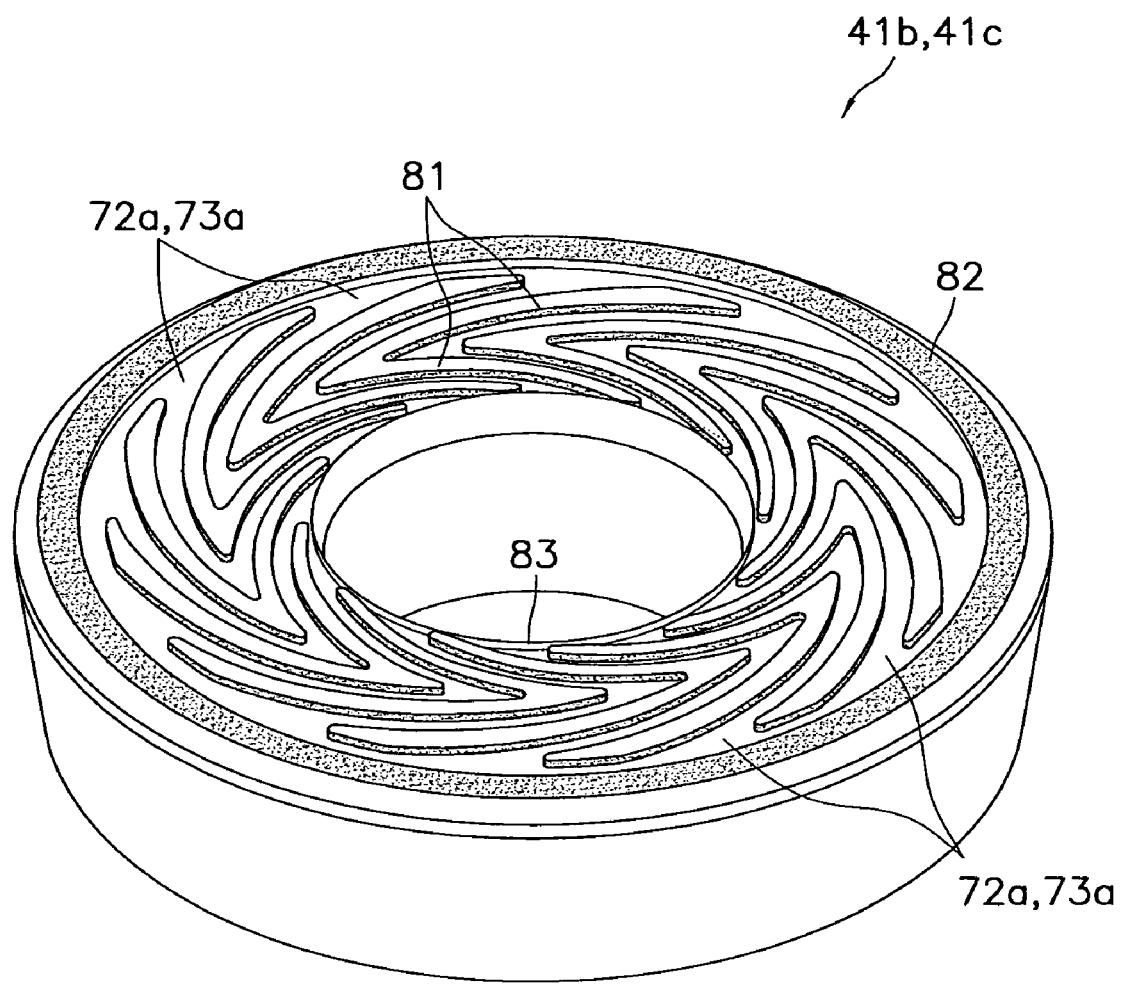
FIG. 3 is a perspective view showing a structure of a flange portion of a shaft included in the hydrodynamic bearing device of FIG. 2.

The thrust dynamic pressure generation grooves 72a and 73a are formed between convex portions 81 having a herringbone pattern (see FIG. 3). The thrust dynamic pressure generation grooves 72a and 73a formed on the first and second thrust flanges 41b and 41c will be described below in more detail.

The first and second thrust flanges 41b and 41c have a tapered shape on outer peripheries. Specifically, the outer peripheral surfaces of the first and second thrust flanges 41b and 41c are sloped such that they become further from the inner peripheral surfaces of the first and second cylinder-shaped protrusions 42b and 42c as they extend toward the lower side and the upper side in the axial direction.

(Sleeve 42)

The sleeve 42 is a cylinder-shaped member of a rotating part which is symmetrical in a vertical direction and included in the hydrodynamic bearing device 4, and is a cylinder-shaped member located so as to be rotatable with respect to the shaft 41. For example, the sleeve 42 includes a cylinder-shaped portion having a communicating hole 42e, which will be described below, formed by press-fitting (fitting and inserting) and assembling an inner sleeve 43 having a plurality of D-shaped portions formed on an outer peripheral surface into an outer sleeve 44. More specifically, the sleeve 42 is formed of the inner sleeve 43 and the outer sleeve 44 as described above, and includes a plurality of radial dynamic pressure generating grooves 71a and 71b, a concave portion 42a, the first cylinder-shaped protrusion 42b, the second cylinder-shaped protrusion 42c, a fixed portion 42d, a plurality of communicating holes 42e, a clamper inscribed portion 42f, a rotor hub inscribed portion 42g, and a circular convex portion 42h.

The radial dynamic pressure generating grooves 71a and 71b are grooves formed on an inner peripheral surface of the sleeve 42 which are positioned with equal interval from each other in a circumferential direction, and formed between convex portions having a spiral pattern which are not shown in the figure.

The concave portion 42a is a circular concave portion formed on the inner periphery of the sleeve 42, and positioned between the radial dynamic pressure generating grooves 71a and 71b in the axial direction.

The first and the second protrusions 42b and 42c are cylinder-shaped portions which are the outer periphery on both ends of the sleeve 42 protruding outward in the axial direction. Facing the inner peripheries of the first and the second protrusions 42b and 42c, the first and the second flanges 41b and 41c are provided. Thus, the inner diameters of the first and the second protrusions 42b and 42c are set to be larger than an inner diameter of the sleeve 42.

The fixed portion 42d is a cylinder-shaped portion of the sleeve 42 which further protrudes upward in the axial direction from an end of the second cylinder-shaped portion 42c. The inner diameter of the fixed portion 42d is set to be larger than the inner diameter of the second tubular portion 42c, and a cover 45 is fixed to the inner periphery of the fixed portion 42d by adhering or the like.

The communicating holes 42e are formed between the inner sleeve 43 and the outer sleeve 44, and are positioned with equal intervals from each other in the circumferential direction so as to penetrate the sleeve 42 in the axial direction.

The clamper inscribed portion 42f is a portion where the clamper 39 for fixing the recording discs M to the rotor hub 31 contacts the sleeve 42, and is a cylinder-shaped portion which further protrudes upward in the axial direction from the end of the second cylinder-shaped portion 42c. In the present embodiment, the fixed portion 42d and the clamper inscribed portion 42f refer to the same portion.

The rotor hub inscribed portion 42g is a portion integrated such that the rotor hub 31 (see FIG. 1) contacts the sleeve 42.

The circular convex portion 42h is a circular convex portion which is formed approximately near the center of the sleeve 42 in the axial direction.

(Structure of Bearing Portions 71, 72 and 73 Between the Shaft 41 and the Sleeve 42)

A lubricant 46 is filled between the shaft 41 and the sleeve 42. Between the first thrust flange 41b and the first cylinder-shaped portion 42b, and between the second thrust flange 41c and the second cylinder-shaped portion 42c, tapered seal portions 48a and 48b are respectively formed.

In the hydrodynamic bearing device 4, a radial bearing portion 71 for supporting the rotor 3 in the radial direction is formed of the sleeve 42 having the radial dynamic pressure generating grooves 71a and 71b, the shaft 41, and the lubricant 46 interposed therebetween. A first thrust bearing portion 72 for supporting the rotor 3 in the axial direction is formed of the first thrust flange 41b having the thrust dynamic pressure generating grooves 72a, the sleeve 42, and the lubricant 46 interposed therebetween. A second thrust bearing portion 73 for supporting the rotor 3 in the axial direction is formed of the second thrust flange 41c having the thrust dynamic pressure generating grooves 73a, the sleeve 42, and the lubricant 46 interposed therebetween.

Now, when a member of the rotating part (for example, the sleeve 42) relatively rotates with respect to a member of the fixed part (for example, the shaft 41), force (dynamic pressure) to maintain a certain gap from the member of the rotating part is generated respectively in the radial direction and the axial direction of the shaft 41 at the bearing portions 71, 72 and 73. In this way, non-contact state between the rotating member and the fixed member can be established, and rotation of the spindle motor 1 can be started efficiently.

[Structure of the First and the Second Thrust Bearing Portions 72 and 73]

As shown in FIG. 2, in the spindle motor 1 of the present embodiment, the first and the second thrust bearing portions 72 and 73 are formed between the first thrust flange 41b and the second thrust flange 41c, which are included in the shaft 41 which forms the hydrodynamic bearing device 4, and the inner sleeve 43. On surfaces of the first and the second thrust bearing portions 72 and 73 on the side of the first thrust flange 41b and the side of the second thrust flange 41c, the thrust dynamic pressure generating grooves 72a and 73a are respectively formed as shown in FIGS. 2 and 3.

Figure 4:
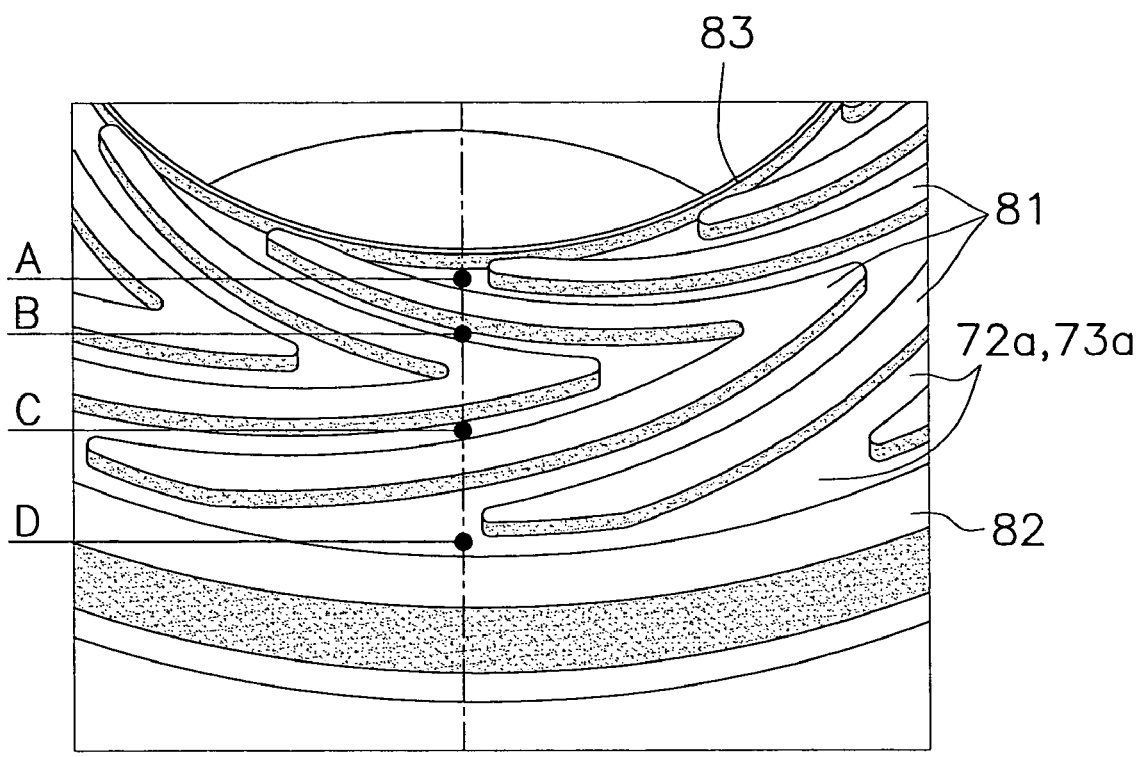
FIG. 4 is an enlarged view showing a structure of thrust dynamic pressure generating grooves of FIG. 3.
Figure 5:
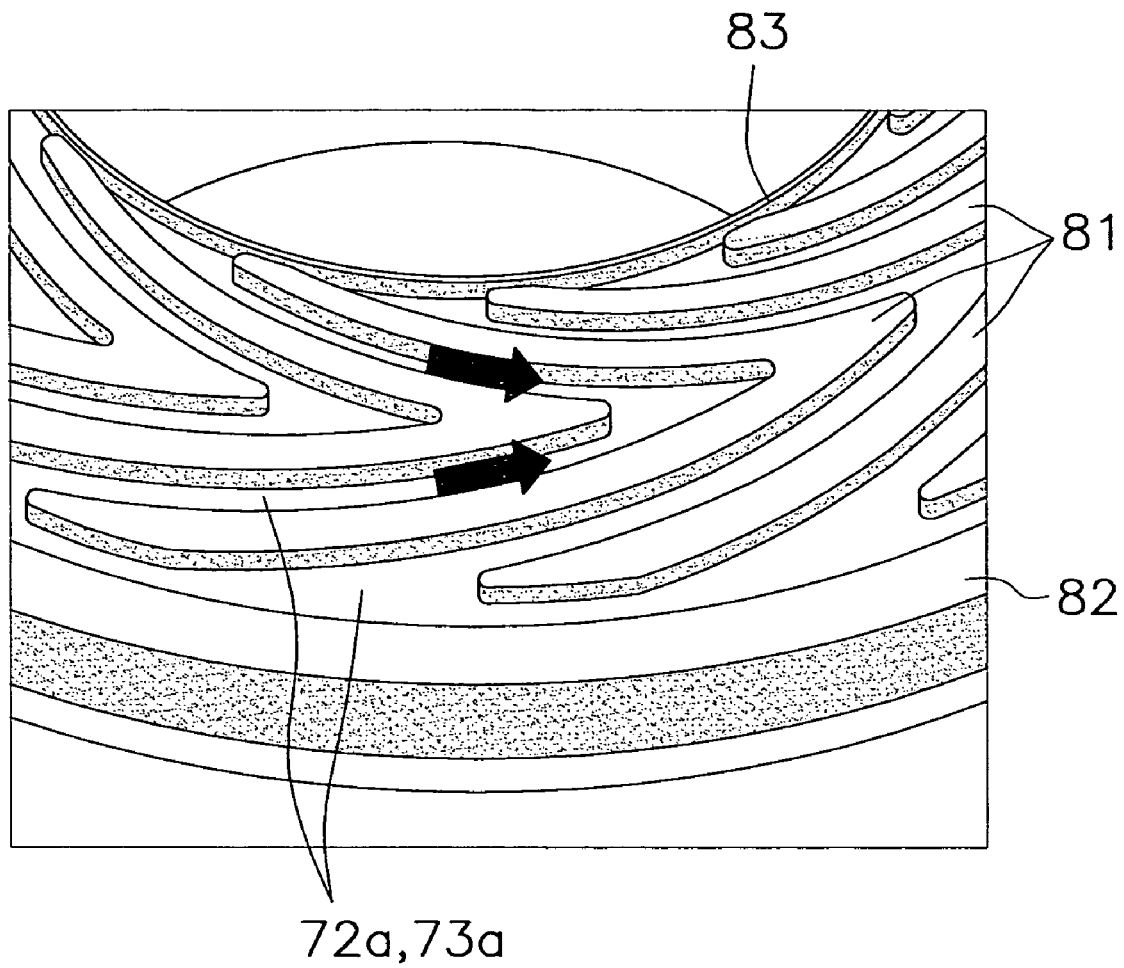
FIG. 5 is an enlarged view showing directions of dynamic pressures generated at the thrust dynamic pressure generating grooves of FIG. 4.

The thrust dynamic pressure generating grooves 72a and 73a are formed between a plurality of convex portions 81 having the herringbone pattern, which are formed on surfaces of the first and the second thrust flanges 41b and 41c which oppose both end surface of the inner sleeve 43 in the axial direction. The thrust dynamic pressure generating grooves 72a and 73a are formed to have a groove depth which gradually becomes greater from the inner periphery toward the outer periphery in a radial direction of a circle having the rotational axis of the shaft 41 as a center. Specifically, as shown in FIG. 4, if there are four points A, B, C, and D located in this order from the center toward the outside, the thrust dynamic pressure generating grooves 72a and 73a are formed such that the depth of the grooves at the four points have the relationship of point A<point B<point C<point D. The thrust dynamic pressure generating grooves 72a and 73a (convex portions 81 having the herringbone pattern) may be formed by machining methods such as an etching process which allows machining with a high precision, electrolytic machining method with a high precision and a short production time, a press working method with a low manufacturing cost, and the like.

On the surfaces of the first and the second thrust flanges 41b and 41c, on which the thrust dynamic pressure generating grooves 72a and 73a are formed, circular convex portions 82 and 83 are respectively formed on an edge of the inner periphery and an edge of the outer periphery.

The circular convex portions 82 and 83 are formed such that a height in the axial direction from the surface on which the thrust dynamic pressure generating grooves 72a and 73a are formed is greater than the groove depth of the thrust dynamic pressure generating grooves 72a and 73a. In other words, the circular convex portions 82 and 83 protrudes more than the convex portions 81 having the herringbone pattern which form the thrust dynamic pressure generating grooves 72a and 73a do on the surface on which the thrust dynamic pressure generating grooves 72a and 73a are formed.

Normally, when the spindle motor 1 is not rotating, the first and the second thrust flanges 41b and 41c and the inner sleeve 43 which form the thrust bearing portions 72 and 73 are in contact with each other.

When the spindle motor 1 starts to rotate, initially, the first and the second thrust flanges 41b and 41c and the inner sleeve 43 have metal-to-metal contact therebetween. However, a dynamic pressure is generated by the lubricant 46 interposed therebetween and the thrust dynamic pressure generating grooves 72a and 73a formed on the first and the second thrust flanges 41b and 41c. A gap is formed between two members (the first and the second thrust flanges 41b and 41c and the inner sleeve 43). Thus, when the spindle motor 1 rotates, it is possible to float only the sleeve 42 of the rotating part with respect to the shaft 41 of the fixed part, and moves it into a non-contact state.

In the spindle motor 1 of the present embodiment, the thrust dynamic pressure generating grooves 72a and 73a are formed such that the groove depth becomes greater from the inner periphery toward the outer periphery. The lubricant 46 existing in the thrust bearing portions 72 and 73 has a property to move to a narrower space when the spindle motor 1 starts to rotate. Thus, the lubricant 46 can efficiently flows toward the inner periphery where the thrust dynamic pressure generating grooves 72a and 73a have smaller groove depth when the rotation starts, and effectively cause the sleeve 42 of the rotating part to float. As a result, a time period of metal-to-metal contact between the shaft 41 of the fixed part and the sleeve 42 of the rotating part at the start of rotation can be reduced significantly.

A plurality of thrust dynamic pressure generating grooves 72a and 73a formed between a plurality of convex portions 81 having the herringbone pattern are all connected to each other on the thrust dynamic pressure generating surface of the thrust bearing portions 72 and 73. Thus, the lubricant 46 does not become insufficient during a time period until the sleeve 42 of the rotating part relatively moves with respect to the shaft 41 of the fixed part and floats from the state they are in metal-to-metal contact. As a result, even if the rotation of the spindle motor 1 is started and suspended repeatedly, a required dynamic pressure can be generated efficiently. Thus, contamination due to metal-to-metal contact can be suppressed to the minimum level.

Further, even when the convex portions 81 having the herringbone pattern which form the thrust dynamic pressure generating grooves 72a and 73a are worn off by precession because metals are in contact with each other when the rotation is started in the spindle motor 1, the direction of the lubricant 46 to flow can be always one direction (in this example, direction toward rotational axis center). This is because the groove depth of the thrust dynamic pressure generating grooves 72a and 73a are formed to be greater from the inner periphery toward the outer periphery as described above. Accordingly, the dynamic pressure balance in the thrust bearing portions 72 and 73 can be maintained in one direction for a long period of time.

The plurality of convex portions 81 having the herringbone pattern and the circular convex portions 82 and 83 on the inner and outer peripheries are not connected on at least one side of the inner periphery and the outer periphery. A gap is formed therebetween. Thus, even when the surface on which the thrust dynamic pressure generating grooves 72a and 73a are formed is sloped toward the surface of the first and the second thrust flanges 41b and 41c which opposes thereto at the start of the rotation of the spindle motor 1, the lubricant 46 can be supplied immediately from the wider portion of the gap toward the narrower portion. Thus, spin-up time of the spindle motor 1 can be reduced.

Further, the convex portions 81 having the herringbone pattern which form the thrust dynamic pressure generating grooves 72a and 73a are formed of a plurality of groove patterns arranged in a shape of herringbone. In the groove patterns of the herringbone shape, a portion closer to the center than a turn of the grooves generates a pressure in a direction toward the outer periphery, and a portion closer to the outer periphery than the turn of the grooves generates a dynamic pressure in a direction toward the inner periphery (direction toward the shaft 41) (see FIG. 5).

Figure 6:
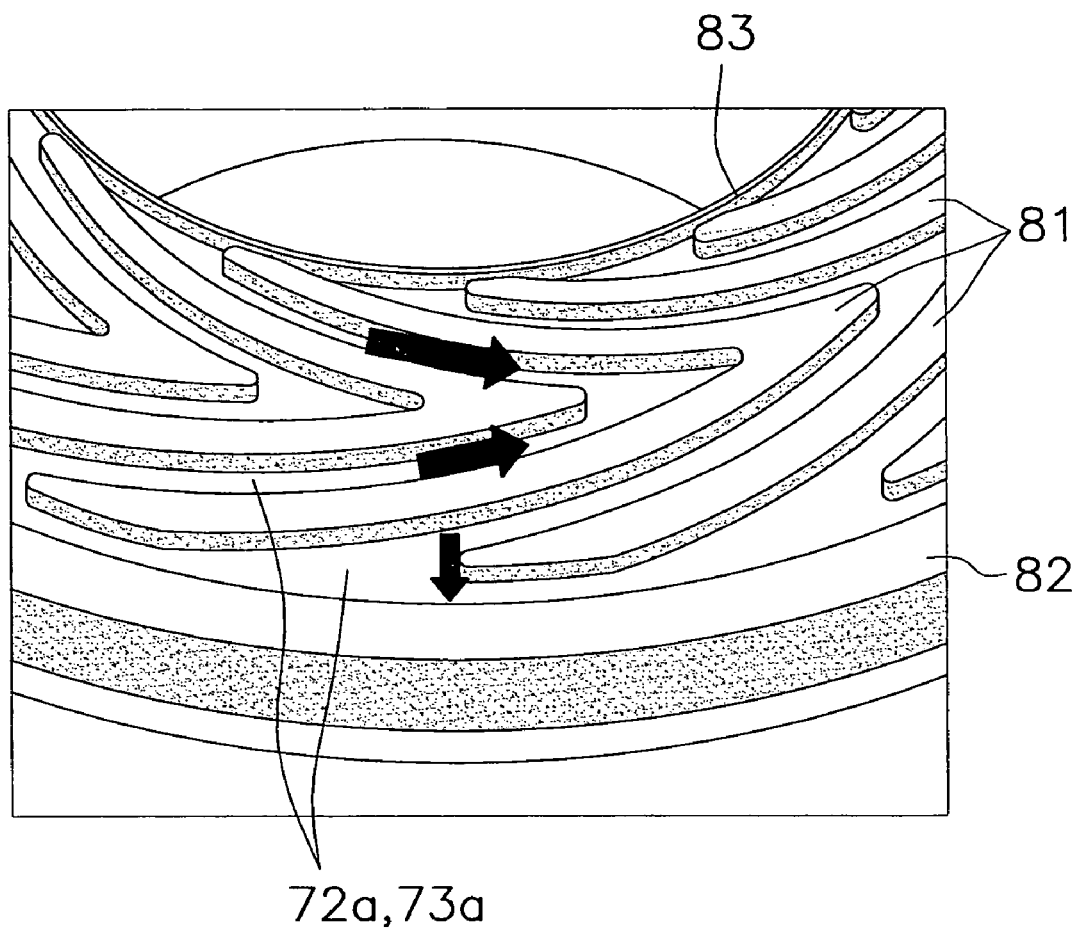
FIG. 6 is an enlarged view showing an imbalanced state of the dynamic pressures generated at an inner periphery and an outer periphery of convex portions having a herringbone pattern in the thrust dynamic pressure generating grooves of FIG. 4.
Figure 7:
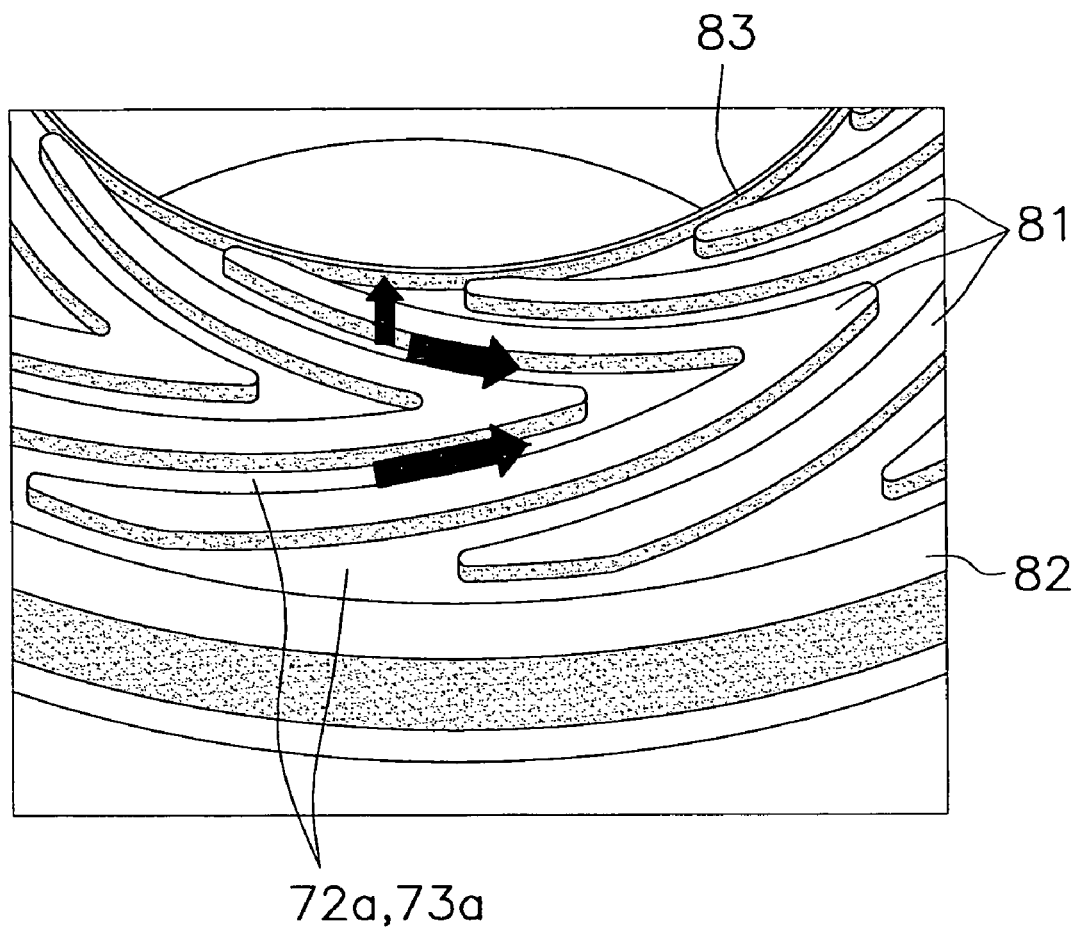
FIG. 7 is an enlarged view showing an imbalanced state of the dynamic pressures generated at the inner periphery and the outer periphery of convex portions having the herringbone pattern in the thrust dynamic pressure generating grooves of FIG. 4.

The dynamic pressure generated here is determined by the shape of the grooves (shape of the pattern, groove depth), floating quantity, perpendicularity, and the like. However, the shapes are different between the inner portion and outer portion. Thus, there is imbalance between the pressure toward the outer periphery and the pressure toward the inner periphery. Accordingly, for example, when the pressure toward the outer periphery is larger than the pressure toward the inner periphery, as shown in FIG. 6, a pressure of a magnitude corresponding to the difference is applied toward the outer periphery. On the other hand, when the pressure toward the inner periphery is larger than the pressure toward the outer periphery, as shown in FIG. 7, a pressure of a magnitude corresponding to the difference is applied toward the inner periphery.

Normally, outside the thrust patterns, a capillary seal portion (not shown) or the like is provided. However, if the pressure difference is too large, problems such as leakage of oil from the inner periphery or the outer periphery may occur.

In the spindle motor 1 of the present embodiment, as described above, the circular convex portions 82 and 83 are respectively formed on edges of the inner periphery and the outer periphery of the thrust bearing portions 72 and 73.

Thus, the pressure applied toward the inner periphery or the outer periphery due to a pressure difference generated between the inner periphery and the outer periphery of the patterns such as the convex portions 81 having the herringbone pattern can be absorbed. In this way, problems such as oil leakage can be prevented.

Figure 8:
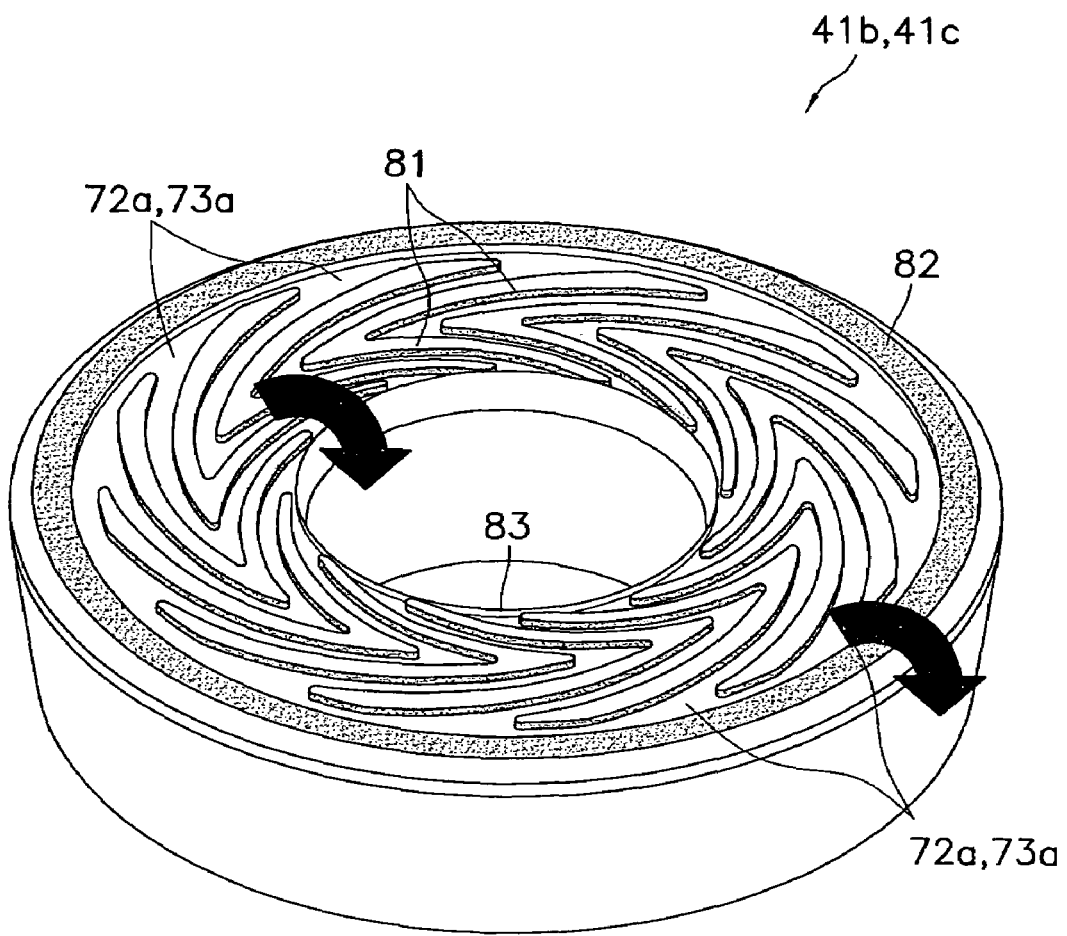
FIG. 8 is a perspective view showing directions to which an etchant tend to spill when the thrust dynamic pressure generating grooves of FIG. 4 are being formed.

When the thrust dynamic pressure generating grooves 72a and 73a are formed by an etching method, as shown in FIG. 8, an etchant for forming the groove patterns of the convex portions 81 having the herringbone pattern in the etching process, and at the same time, may flow out from the inner periphery or the outer periphery to the outside as it forms the groove patterns.

Figure 9:
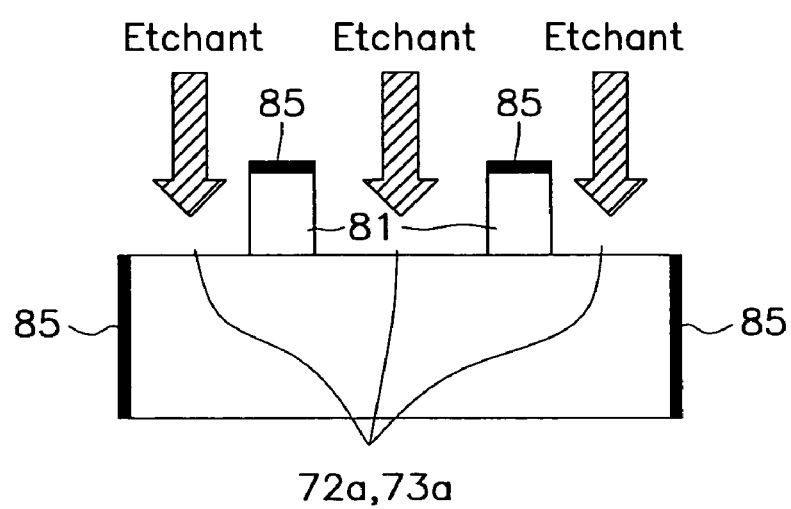
FIG. 9 is a cross-sectional view showing a relationship between the etchant and masking portions when the thrust dynamic pressure generating grooves are being formed in a conventional hydrodynamic bearing device.

Particularly, the etchant flown out from the inner periphery causes a problem because the inner periphery is a fitting portion with the shaft and the corrosion by the etchant may change the dimension of the fitting portion. On the other hand, etchant flown out from the outer periphery may cause a problem such as oil leakage and the like. The outer periphery is a capillary seal portion of the thrust bearing portions 72 and 73 and its surface roughness, dimensions, shapes and the like are important for providing a sealing capability. The corrosion by the etchant may result in a failure of providing such effects. Therefore, if the circular convex portions 82 and 83 are not provided on the inner and outer peripheries in the structure, as shown in FIG. 9, it is necessary to form masking portions 85 on both the inner and outer peripheral surfaces so as to prevent corrosion of the inner periphery and the outer periphery by the etchant.

In the spindle motor 1 according to the present embodiment, as described above, the circular convex portions 82 and 83 are formed on the surface on which the thrust dynamic pressure generating grooves 72a and 73a are formed on the inner periphery side and the outer periphery side. The circular convex portions 82 and 83 protrude more than the convex portions 81 having the herringbone pattern, which form the thrust dynamic pressure generating grooves 72a and 73a, do.

Figure 10:
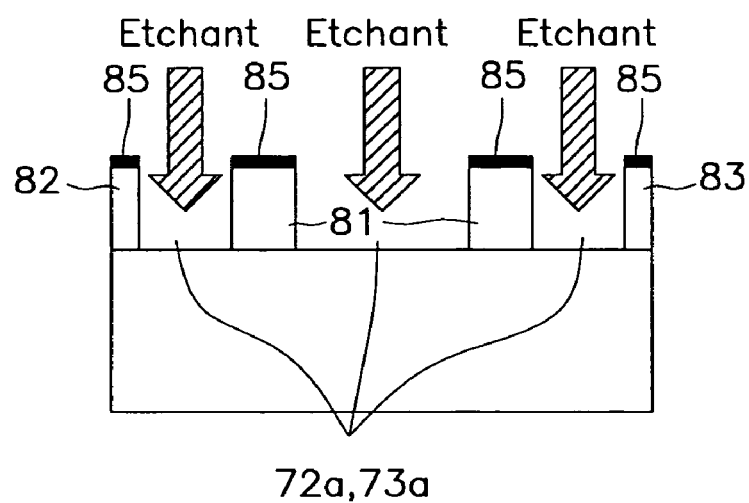
FIG. 10 is a cross-sectional view showing a relationship between the etchant and masking portions when the thrust dynamic pressure generating grooves of FIG. 4 are being formed.

In this way, the etchant can be prevented from flowing out from the inner periphery or the outer periphery during a process in an etching method as described above. Thus, as shown in FIG. 10, the masking portions 85 which are required to be formed on the inner periphery and the outer periphery in the conventional structure are no longer necessary. Thus, a masking step can be omitted and the production cost can be reduced.

[Features of the Spindle Motor 1]

(1)

As shown in FIG. 2, the spindle motor 1 of the present embodiment includes the hydrodynamic bearing device 4 including the shaft 41, the sleeve 42, the first and the second thrust flanges 41b and 41c, the first and second thrust bearing portions 72 and 73 and the thrust dynamic pressure generating grooves 72a and 73a. As shown in FIG. 4, the thrust dynamic pressure generating grooves 72a and 73a are formed such that a plurality of groove portions are connected without being isolated from each other, and the groove depth becomes greater from the inner periphery toward the outer periphery.

In this way, dynamic pressure toward the inner periphery can be generated efficiently in the thrust bearing portions 72 and 73. Thus, a negative pressure generated near the rotational center of the thrust bearing portions 72 and 73 can be prevented. The sleeve 42 or the like of the rotating part can be floated easily. As a result, a time period of the metal-to-metal contact between the shaft 41 of the fixed part and the sleeve 42 of the rotating part can be reduced significantly compared to that in the conventional structure. Therefore, contamination caused by metal-to-metal contact can be prevented, and a hydrodynamic bearing device with a high reliability can be obtained.

Further, the groove depth of the thrust dynamic pressure generating grooves becomes greater toward the outer periphery. Although the a portion near the outside diameter of the flanges are in contact and the convex portions of the thrust dynamic pressure generating grooves are worn out because of metal-to-metal contact, the dynamic pressure is always applied in one direction (in this example, a direction toward the rotational axis center). The balance of the dynamic pressure of the thrust bearing can be maintained in one direction for a long period of time.

(2)

As shown in FIG. 2, the spindle motor 1 of the present embodiment includes the hydrodynamic bearing device 4 including the shaft 41, the sleeve 42, the first and the second thrust flanges 41b and 41c, the first and second thrust bearing portions 72 and 73, the thrust dynamic pressure generating grooves 72a and 73a, and the circular convex portions 82 and 83. As shown in FIG. 3, the circular convex portions 82 and 83 are respectively provided on an edge of the inner periphery side and an edge on the outer periphery in the thrust bearing portions 72 and 73. They are formed so as to have a height larger than that of the convex portions 81 having the herringbone pattern, which form the thrust dynamic pressure generating grooves 72a and 73a.

Thus, for example, even when the thrust dynamic pressure generating grooves 72a and 73a (convex portions 81 having the herringbone pattern) are formed by an etching process, the etchant used for the process can be prevented from leaking out from the inner periphery and the outer periphery. As a result, the outer peripheral surface and the inner peripheral surface do not have to be treated with a masking process for preventing leakage of the etchant, or the like. Thus, the production cost can be reduced compared to the conventional art.

(3)

In the spindle motor 1 of the present embodiment, the thrust dynamic pressure generating grooves 72a and 73a are formed on the surface on the side of the first and the second thrust flanges 41b and 41c in the thrust bearing portions 72 and 73 of the hydrodynamic bearing device 4. The thrust dynamic pressure generating grooves 72a and 73a have the groove depth which becomes greater from the inner periphery toward the outer periphery. Further, on the edges of the surface where the thrust dynamic pressure generating grooves 72a and 73a are formed on the inner periphery side and the outer periphery side, the circular convex portions 82 and 83 having the height greater than the groove depth of the thrust dynamic pressure generating grooves 72a and 73a are formed.

The circular convex portions 82 and 83 formed on the inner peripheral side and the outer peripheral side can reduce the flow of the lubricant 46 toward the outer periphery. Thus, the dynamic pressure balance in the thrust bearing portions 72 and 73 can be stabilized.

(4)

In the spindle motor 1 of the present embodiment, the convex portions 81 which form the thrust dynamic pressure generating grooves 72a and 73a are formed of groove patterns having the herringbone pattern on the surfaces of the first and the second thrust flanges 41b and 41c in the thrust bearing portions 72 and 73 of the hydrodynamic bearing device 4.

Normally, when the thrust dynamic pressure generating grooves are formed of the convex portions having the herringbone pattern, there is often an imbalance in the magnitudes of the dynamic pressures generated at the inner periphery and the outer periphery of the groove patterns.

In the hydrodynamic bearing device 4 of the present embodiment, the thrust dynamic pressure generating grooves 72a and 73a are formed such that the groove depth becomes greater from the inner periphery toward the outer periphery.

Thus, even though there is an imbalance in the magnitudes of the dynamic pressures generated at the inner periphery and the outer periphery of the convex portions 81 having the herringbone pattern, a larger dynamic pressure can be generated toward the inner periphery. As a result, an imbalance in the dynamic pressures generated near the convex portions 81 having the herringbone pattern can be alleviated, and the hydrodynamic bearing device 4 which can maintain the stabilized dynamic pressure balance can be obtained.

OTHER EMBODIMENTS

One embodiment of the present invention has been described above. However, the present invention is not limited to the above embodiment. Various modifications can be made within the scope of the invention.

(A)

In the above embodiment, the hydrodynamic bearing device 4 having the shaft 41 as a fixed part has been described as an example. However, the present invention is not limited to such an example.

Figure 11:
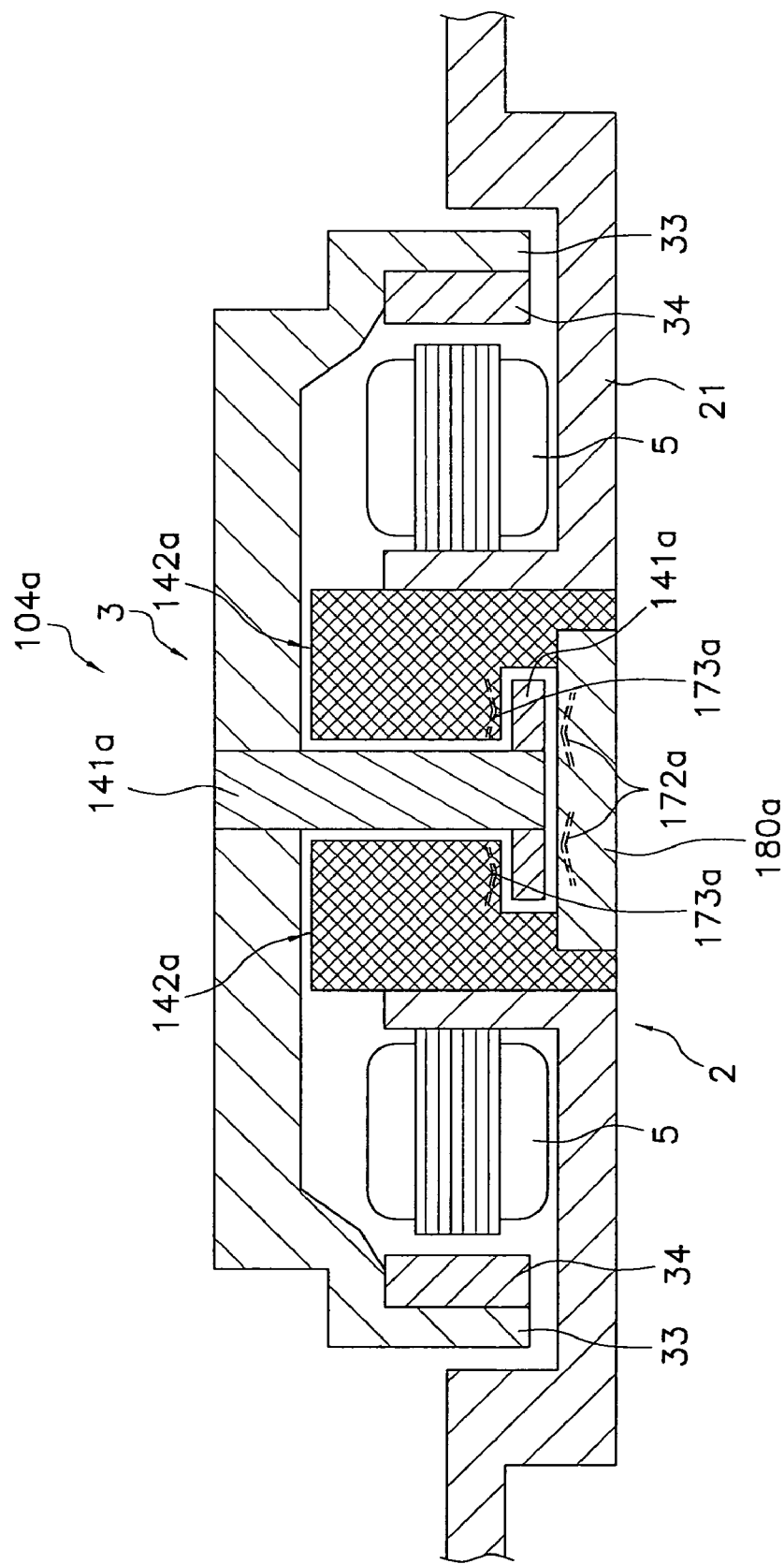
FIG. 11 is a cross-sectional view showing a structure of a hydrodynamic bearing device according to another embodiment of the present invention.
Figure 12:
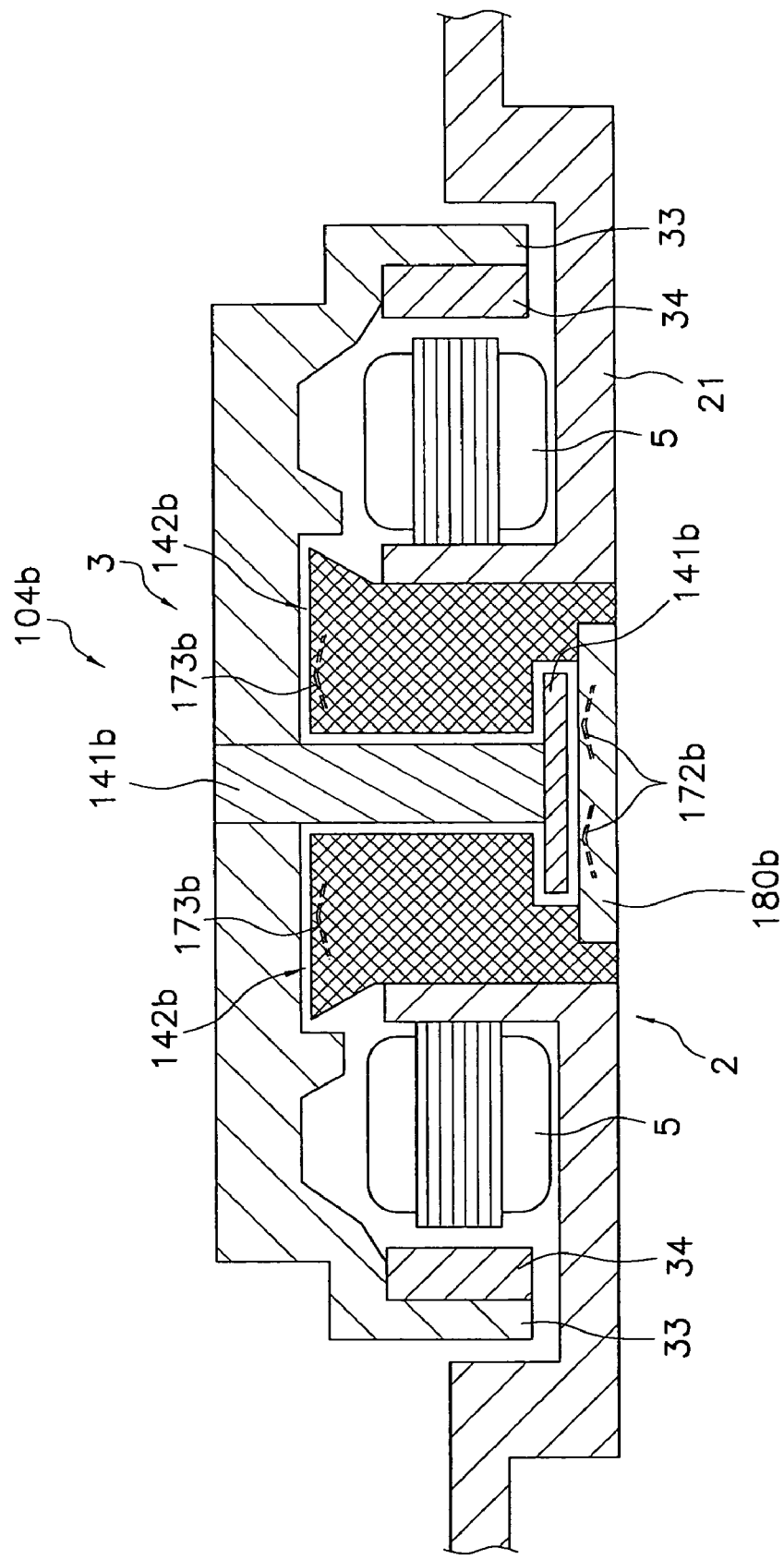
FIG. 12 is a cross-sectional view showing a structure of a hydrodynamic bearing device according to yet another embodiment of the present invention.

For example, the present invention is also applicable to hydrodynamic bearing devices 104a and 104b of a shaft rotation type shown in FIG. 11 or 12, which respectively have shafts 141a and 141b as a rotating part.

For example, in the hydrodynamic bearing device 104a shown in FIG. 11, the dynamic pressure balance is kept by generating dynamic pressures at thrust dynamic pressure generating grooves 173a formed on a sleeve 142a and thrust dynamic pressure generating grooves 172a formed on a lower plate 180a located below the shaft 141a. In this way, similar effects as those described above can be obtained.

Also, in the hydrodynamic bearing device 104b shown in FIG. 12, the dynamic pressure balance is kept by generating dynamic pressures at thrust dynamic pressure generating grooves 173b formed on a sleeve 142b and thrust dynamic pressure generating grooves 172b formed on a lower plate 180b located below the shaft 141b. In this way, similar effects as those described above can be obtained.

(B)

In the above embodiment, the thrust dynamic pressure generating grooves 72a and 73a are formed between the convex portions 81 having the herringbone pattern. However, the present invention is not limited to such an example.

Figure 13:
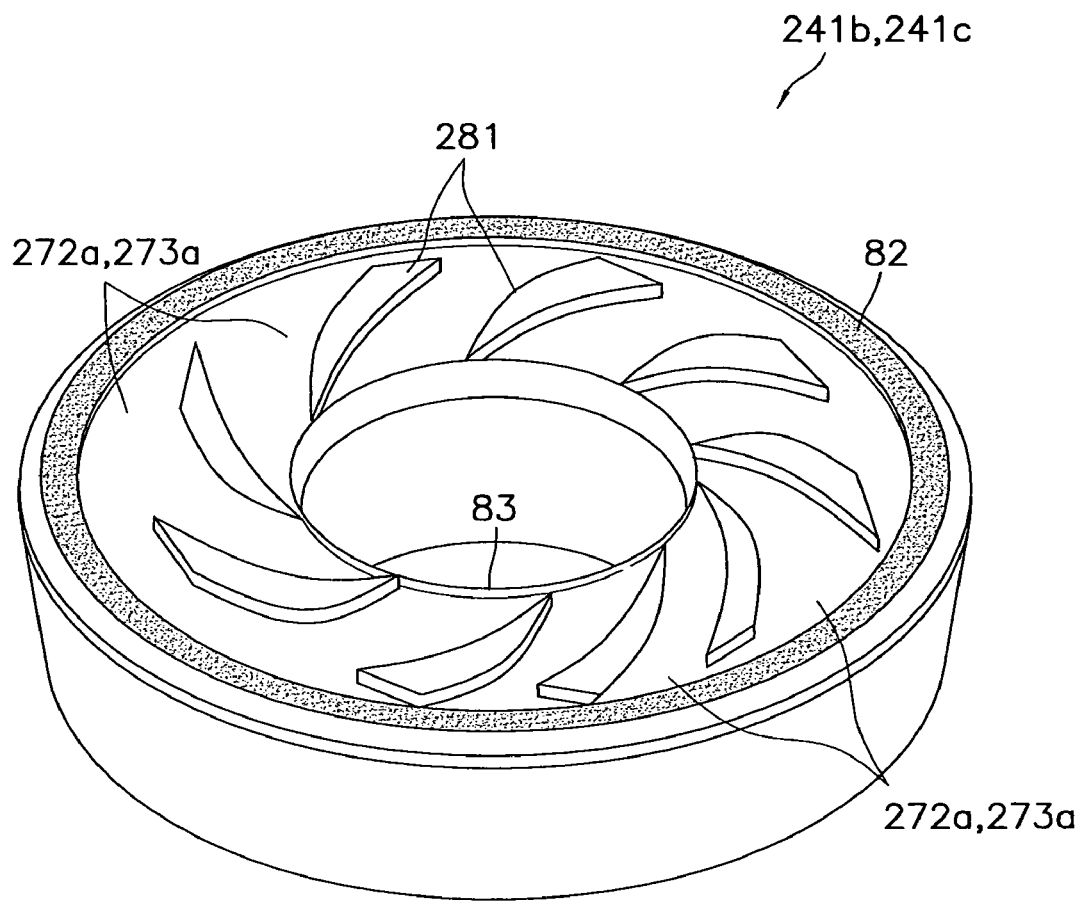
FIG. 13 is a perspective view showing a shape of convex portions which form thrust dynamic pressure generating grooves formed in a thrust bearing portion of the hydrodynamic bearing device according to yet another embodiment of the present invention.

For example, the pattern of the convex portions is not limited to the herringbone pattern. As shown in FIG. 13, thrust flanges 241b and 241c having thrust dynamic pressure generating grooves 272a and 273a formed by convex portions 281 having a spiral pattern may also be used.

(C)

In the present embodiment, the circular convex portions 82 and 83 formed on the surface of the first and the second thrust flanges 41b and 41c, on which the thrust dynamic pressure generating grooves 72a and 73a are formed, have a height larger than that of the convex portions 81 having the herringbone pattern, which form the thrust dynamic pressure generating grooves 72a and 73a. However, the present invention is not limited to such an example.

For example, the circular convex portions 82 and 83 may have the height same as that of the convex portions 81 having the herringbone pattern. Even in this case, the circular convex portions 82 and 83 can effectively prevent leakage of the lubricant such as oil, grease or the like at the inner periphery and the outer periphery of the surfaces of the first and the second thrust flanges 41b and 41c, on which the thrust dynamic pressure generating grooves 72a and 73a are formed.

(D)

In the above embodiment, the present invention is applied to the hydrodynamic bearing device with the both ends of the sleeve 42 being open. However, the present invention is not limited to such an example.

For example, the present invention is also applicable to a hydrodynamic bearing device having only one end of the sleeve being open.

(E)

In the above embodiment, the hydrodynamic bearing device of the present invention is incorporated to the spindle motor. However, the present invention is not limited to such an example.

For example, the present invention is also applicable to various types of hydrodynamic bearing devices incorporated in rotational driving device such as motors other than the spindle motor.

(F)

In the hydrodynamic bearing device 4 of the present embodiment, the thrust dynamic pressure generating portion is formed between a lower surface of the second thrust flange 41c and an upper end surface of the sleeve 42. However, the present invention is not limited to such an example.

Figure 14:
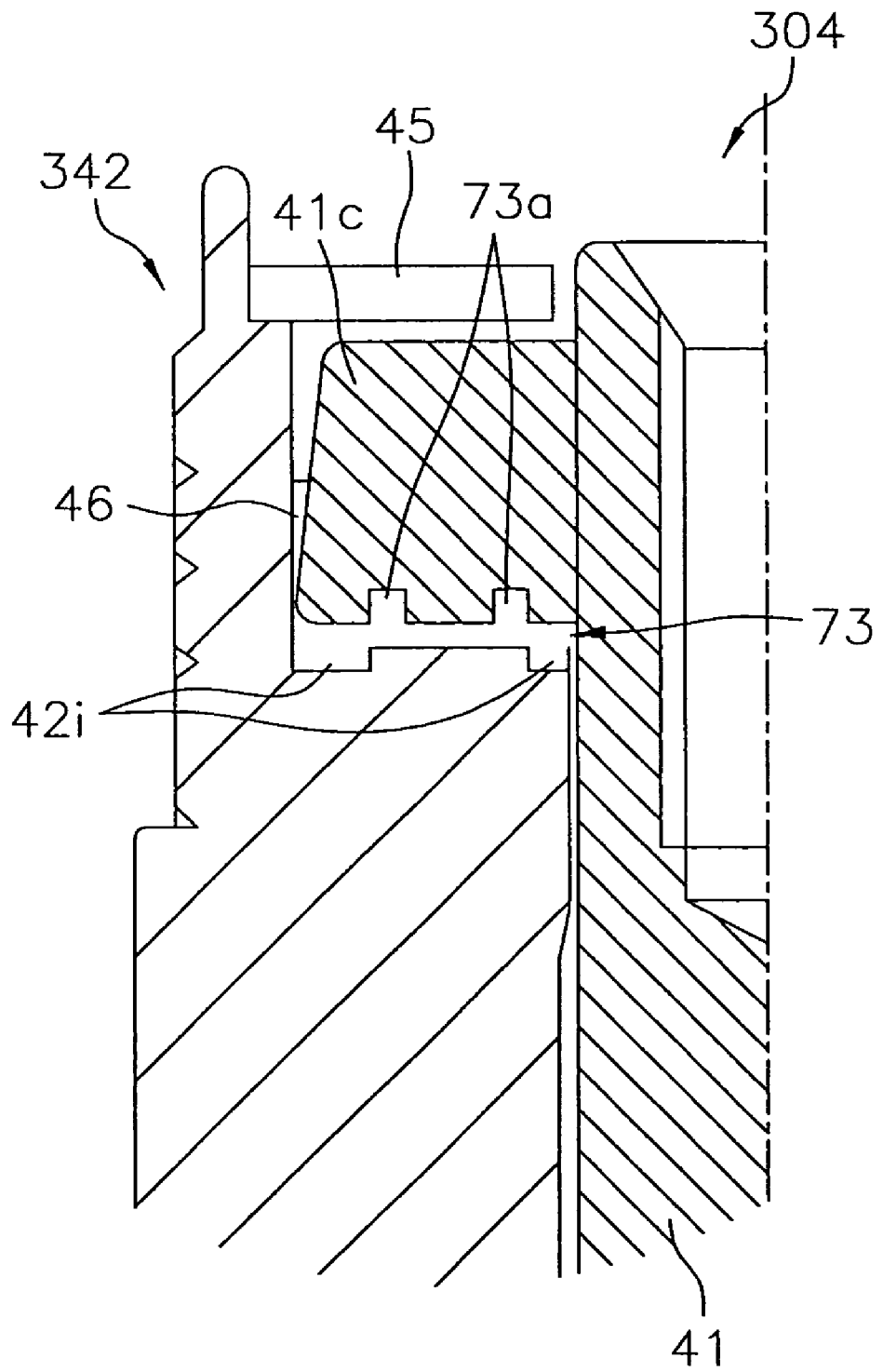
FIG. 14 is an enlarged view showing a structure of a thrust bearing portion in a thrust bearing portion of the hydrodynamic bearing device according to yet another embodiment of the present invention.

For example, a hydrodynamic bearing device 304 as shown in FIG. 14 may be employed. In the hydrodynamic bearing device 304, circular recessed portions (groove portions) 42i are formed on an inner edge portion and an outer edge portion of a surface of a sleeve 342 which forms the second thrust bearing portion 73 with the surface of the second thrust flange 41c having the thrust dynamic pressure generating grooves 73a and which opposes thereto in the axial direction.

Generally, in the thrust bearing portion, dynamic pressures are generated in portions between the thrust dynamic pressure generating grooves and the opposing surface, and a portion between these two portions. However, there is a bearing loss in the portions inside and outside the dynamic pressure generating portions.

Thus, as shown in FIG. 14, the circular recessed portions 42i are formed on the inner edge portion and the outer edge portion of the surface of the sleeve 342 which forms the second thrust bearing portion 73. In this way, a bearing loss which may be generated in the portions other than the portions which substantially generate dynamic pressures can be suppressed effectively.

Further for example, a hydrodynamic bearing device 305 as shown in FIGS. 15A and 15B may be employed. In the hydrodynamic bearing device 305, circular recessed portions (groove portions) 42j, 42k are formed respectively on an inner edge portion and an outer edge portion of a surface of the first and the second thrust flange 41b, 41c which forms the first and the second thrust bearing portion 72, 73 with the surface of the inner flange 343 having the thrust dynamic pressure generating grooves 72a, 73a and which opposes thereto in the axial direction.

INDUSTRIAL APPLICABILITY

The hydrodynamic bearing device of the present invention can be applied to a wide variety of the hydrodynamic bearing devices having thrust dynamic pressure generating portions since it enables improving a reliability of the dynamic pressure bearing by stabilizing the balance of dynamic pressures generated at the thrust bearing portions, and it also has effects to widen a margin for designing the bearing and to reduce the cost.

The invention claimed is:

1. A hydrodynamic bearing device, comprising:
   a shaft which serves as a rotational axis;
   a sleeve having a radial bearing portion formed on an inner peripheral surface which opposes an outer peripheral surface of the shaft;
   a flange integrated near one end of the shaft;
   a thrust bearing portion which is formed between a surface of the flange, which is cross to a rotational axis direction, and a surface which opposes the surface of the flange which is cross to the rotational axis direction; and
   a plurality of thrust dynamic pressure generating grooves formed on either the surface of the flange which is cross to a rotational axis direction or a surface opposing thereto, which forms the thrust bearing portion, the grooves being connected to each other across the entire surface, and having a groove depth which becomes greater from the inner periphery toward the outer periphery with the rotational axis being a center.

2. A hydrodynamic bearing device according to claim 1, wherein:
   circular convex portions having a height greater than a depth of the thrust dynamic pressure generating grooves are respectively formed on the inner periphery and the outer periphery of the surface on which the thrust dynamic pressure generating grooves are formed.

3. A hydrodynamic bearing device, comprising:
   a circular rotor hub;
   a shaft integrated to the rotor hub, which serves as a rotational axis;
   a sleeve having a radial bearing portion formed between an inner peripheral surface of the sleeve and an outer peripheral surface of the shaft;
   a thrust bearing portion formed between a surface of the rotor hub, which is cross to the rotational axis direction, and an opposing surface of the sleeve, which is cross to the rotational axis direction; and
   thrust dynamic pressure generating grooves formed on one of the surfaces of the rotor hub and the sleeve, which are cross to the rotational axis direction, the grooves being connected to each other across the entire surface, and having a groove depth which becomes greater from the inner periphery toward the outer periphery with the rotational axis being a center.

4. A hydrodynamic bearing device according to claim 3, wherein:
   circular convex portions having a height greater than a depth of the thrust dynamic pressure generating grooves are respectively formed on the inner periphery and the outer periphery of the surface on which the thrust dynamic pressure generating grooves are formed.

5. A hydrodynamic bearing device, comprising:
   a shaft which serves as a rotational axis;
   a sleeve having a radial bearing portion formed between an inner peripheral surface of the sleeve and an outer peripheral surface of the shaft;
   a flange integrated near one end of the shaft;
   a thrust bearing portion which is formed between a surface of the flange, which is cross to a rotational axis direction, and a surface which opposes the surface of the flange which is cross to the rotational axis direction;
   thrust dynamic pressure generating grooves formed on either the surface of the flange which is cross to a rotational axis direction or a surface opposing thereto, which forms the thrust bearing portion; and
   circular convex portions respectively formed on the innermost periphery and the outermost periphery of the surface on which the thrust dynamic pressure generating grooves are formed, which have a height greater than a depth of the thrust dynamic pressure generating grooves.

6. A hydrodynamic bearing device according to claim 5, wherein circular groove portions are formed on an inner edge portion and an outer edge portion of a surface which opposes the surface on which the thrust dynamic pressure generating grooves are formed in the axial direction and which forms the thrust bearing portion.

7. A hydrodynamic bearing device, comprising:
   a circular rotor hub;
   a shaft integrated to the rotor hub, which serves as a rotational axis;
   a sleeve having a radial bearing portion formed between an inner peripheral surface of the sleeve and an outer peripheral surface of the shaft;
   a thrust bearing portion formed between a surface of the rotor hub, which is cross to the rotational axis direction, and an opposing surface of the sleeve, which is cross to the rotational axis direction;
   thrust dynamic pressure generating grooves formed on one of the surfaces of the rotor hub and the sleeve, which are cross to the rotational axis direction; and
   circular convex portions respectively formed on the innermost periphery and the outermost periphery of the surface on which the thrust dynamic pressure generating grooves are formed, which have a height greater than a depth of the thrust dynamic pressure generating grooves.

8. A hydrodynamic bearing device according to claim 7, wherein circular groove portions are formed on an inner edge portion and an outer edge portion of a surface which opposes the surface on which the thrust dynamic pressure generating grooves are formed in the axial direction and which forms the thrust bearing portion.

* * * * *